United States Patent [19]
Rice

[11] 3,979,562
[45] Sept. 7, 1976

[54] DECODER

[76] Inventor: Dale E. Rice, 15734 Parthenia St., Sepulveda, Calif. 91343

[22] Filed: Nov. 29, 1974

[21] Appl. No.: 528,421

[52] U.S. Cl. .......................................... 179/84 VF
[51] Int. Cl.² ........................................ H04M 1/50
[58] Field of Search ................... 179/84 VF, 84 R; 328/138, 140, 167; 307/233; 324/78 D

[56] References Cited
UNITED STATES PATENTS

| | | | |
|---|---|---|---|
| 3,537,001 | 10/1970 | Friend | 179/84 VF |
| 3,760,269 | 9/1973 | Beeman | 324/78 D |
| 3,790,720 | 2/1974 | Schartmann | 179/84 VF |

*Primary Examiner*—Kathleen H. Claffy
*Assistant Examiner*—Joseph A. Popek
*Attorney, Agent, or Firm*—Kleinberg, Morganstern & Scholnick

[57] ABSTRACT

An improved decoder is settable to recognize the digits of a preselected code and utilizes two complementary semi-conductor digital counters. Such counters draw very little current from their operating voltage supplies unless and until an energized output line of the counter is connected to a low voltage sink for such current. The first counter is advanced in response to a spacing (interdigit) pulse which follows the transmission of a digit, provided that such a spacing pulse is preceded by a "correct" digit of the preselected code number as received by the second counter. An energized output line of the first counter is connected to that output of the second counter which would be energized if the correct code digit had appeared. If the bilevel voltages of the interconnected lines are in agreement, indicating appearance of a correct code digit, they do not draw current from each other. If the bilevel voltages of the interconnected lines are in disagreement indicating appearance of an incorrect digit, very substantial current is drawn from the first counter. The current flow from the voltage supply of the first counter is monitored by a transistor switching circuit which responds to substantial current flow to order the resetting and clearing of the counters, so that the first counter can only reach its peak count if the required sequence of correct code numbers appears.

20 Claims, 3 Drawing Figures

DECODER

BACKGROUND OF THE INVENTION

1. Field of the Invention

The present invention relates to a decoder which is adapted to receive the dialing or keying signals which are transmitted over telephone systems, and similar selective signaling systems, and is settable to recognize any preselected sequence or code of dialed numbers and produce a corresponding output recognition signal. The invention relates particularly to such a decoder which utilizes counters in its decoding circuitry which are mechanized with complementary semi-conductor circuitry and further utilizes in conjunction with such counters a novel and unique control switching circuit for ordering the reset of a counter whenever a number sequence differing from the preselected code is received.

2. Description of the Prior Art

Telephone decoders are used in a wide variety of selective signaling applications, as for example in the receivers of two-way radio-telephone networks or two-way radio communication systems and also in party line telephone signaling. In such communication networks, communication between a central transmitter and any desired remote receiver is often established by transmitting a common tone signal to all receivers. In order to address or dial a selected one of those receivers, the transmitter tone is interrupted to represent the sequential digits of the telephone number or code number of the desired remote receiver. The decoder in that receiver is preset to recognize that particular pattern of tone interruptions as its preset digit sequence, and responds by producing an output recognition signal which may be used to sound a horn or buzzer, light a signaling light, or otherwise activate some output device. The receiver operator can then respond and acknowledge to the transmitter that he is available to receive a message on the common transmission link, and the two-way communciation process is thereby begun. During the same period that the decoder in the selected receiver recognizes that it has received its correct dialed code, the respective decoders in all other receivers recognize that they have received an incorrect dialed code and are thereby reset to their initial starting or monitoring states. Customarily after message transmission has been completed, the sending transmitter may switch off its tone signal and this normally has the effect of assuring resetting of all the decoders in the remote receivers to their initial or monitoring states, so that they can perform properly when the tone is switched on again at a later time for the transmission of another dialing select.

Consider for example, a conventional radio-telephone signaling system in which a central transmitter desires to communicate with a particular receiver which has the code number 324. To do this, the transmitter begins to transmit a tone signal and then begins to interrupt that tone signal in a pattern of interrupts sequentially representing the digits 3, 2, and 4. Such a pattern of interrupts in the conventional telephone code is first a series of three interrupts, then a pause, then a series of two interrupts, then a pause, then a series of four interrupts, and then a pause to thereby complete the representation of the code number 324. This pattern of interrupts is recognized by the decoder in receiver No. 324. which then responds by producing a recognition signal to activate a buzzer, light, etc. The operator of the receiver then picks up his phone, indicates that he is receiver 324 answering the call, and a two-way communication is then conducted. During the same period the decoder in receiver 324 was recognizing the interrupt pattern as being its own code number, the decoders in the other non-selected receivers recognized that the interrupt pattern did not represent their respective code numbers and were thereby reset to their starting positions. The decoder in the selected receiver is later reset either by the cessation of the tone signal after the completion of dialing or by the reception of some additional number sequence which does not correspond with its code setting.

Continuing with the description of such a conventional prior art, radio telephone signaling system, in the receiver decoder the incoming tone signal with its dialed tone interrupts is operated upon by the tone processing circuitry to produce so called digit pulses and interdigit pulses. A single digit pulse is produced in response to each tone interrupt so that an incoming code 324 would occasion the production first of a sequence of three digit pulses constituting a first digit set representing the digit 3, then a pause, then a sequence of two digit pulses constituting a second digit set representing the digit 2, then another pause, then a sequence of four digit pulses constituting a third digit set, representing the digit 4 of the code number 324, and then a final pause. An interdigit pulse is produced during each of the aforesaid pauses, each starting a predetermined time after the occurrence of the last pulse of the preceding digit set and normally being terminated by the occurrence of the first digit pulse of the next digit. Thus, in response to the incoming code 324, three interdigit pulses would be produced by the tone processing circuitry, spaced apart in the pause following the digit sets. The tone processing circuitry may also produce a separate tone presence signal which represents the overall presence or absence of the applied incoming tone signal or alternatively it may use the digit pulses for the same type of indication.

The digit pulses and interdigit pulses are then operated upon by discrete or digital decoding circuitry to recognize only those digit sequences which correspond to the internal code which has been preset in the digital decoding circuitry. Such recognition or decoding operations are ordinarily accomplished through cooperative usage of two counters. The first counter may be termed a digit pulse counter and it counts how many digit pulses occur in each digit set, and then is reset after the digit set by the following interdigit pulse. The second counter may be termed an interdigit pulse counter and it counts each interdigit pulse received so long as each such interdigit pulse is preceded by a "correct" digit set. If an interdigit pulse is not preceded by a correct digit set, then the interdigit pulse counter will not count the following interdigit pulse but will instead be reset at that time to its starting position. Thus, (assuming that code number 324 is the correct code number) the digit pulse counter will be able to attain count of 3 only if each of the correct digit sets 3, 2, and 4 are received in that order. The fact that the interdigit pulse counter has attained a count of 3 can therefore be used as an indication or recognition that the correct code number has been received and the counter state may therefore be used to produce an output recognition signal of the decoder for the purpose of energizing external signaling devices.

The manner in which the two counters are utilized to operate upon the digit pulses and interdigit pulses so as to recognize the preset code can be further clarified by briefly considering the numerical example which is set forth in Table 1 below.

TABLE 1

Operation of Decoder Set to Recognize Code Number 324

| | TIME → | | | | | | |
|---|---|---|---|---|---|---|---|
| | (1st digit set) | | (2nd digit set) | | (3rd digit set) | | |
| Sequence of Digit Pulses- | 1 1 1 | | 1 1 | | 1 1 1 1 | | |
| Sequence of Interdigit Pulses- | | 1 | | 1 | | 1 | |
| Count of Digit Pulse Counter- | 0 1 2 3 | 0 | 1 2 | 0 | 1 2 3 4 | 0 | |
| Count Of Interdigit Pulse Counter- | 0 0 0 0 | 1 | 1 1 | 2 | 2 2 2 2 | 3 | |

Assuming once again that the correct, code number is 324, the first line of Table 1 entitled 'Sequence of Digit Pulses' shows a sequence of three 1's then a space then two 1's then a space then four 1's and a space, representing, in a stylized manner, the time occurrence of the digit pulses in the three digit sets representing the code number 324. The line entitled 'Sequence of Interdigit Pulses' shows three 1's, each representing the production of an interdigit pulse during the pauses following the first, second and third digit sets. The remaining lines show the count states successively obtained by the digit pulse counter and by the interdigit pulse counter in response to their reception of the indicated digit pulses of the first line of Table 1 and the interdigit pulses of the second line of Table 1. It can be seen, referring to Table 1, that initially both counters are assumed to be in their zero count states. Then the three successive pulses of the first digit set are received and the digit pulse counter counts them so as to advance step by step to a count of three. No interdigit pulse has yet been received so that the interdigit pulse counter remains at the same time in its zero count state.

As shown in Table 1 in response to the first interdigit pulse, the digit pulse counter is reset to its zero state and at the same time the interdigit pulse is counted by the interdigit pulse counter (because the interdigit pulse has been preceded by a correct digit set) and the interdigit pulse counter is thereby advanced to a count of 1 in response to the first digit set.

As indicated in Table 1 the same operations are repeated again in response to the pulses of the second digit set and to the second interdigit pulse, so that interdigit pulse counter is thereby advanced to a count of 2 in response to the second interdigit pulse. In the same manner in response to the digit pulses of the third digit set and to the third interdigit pulse, the interdigit pulse counter is advanced to a count of 3 in response to the third interdigit pulse.

The fact that the interdigit pulse counter has attained a count of 3 indicates that the correct code number has been received, because otherwise the interdigit pulse counter would have been reset to its zero count during the process and would therefore never have been able to reach its final attained count of 3. Thus, for example, if an incorrect code 224 was received so that the first digit set had only two digit pulses representing an "incorrect" digit 2 rather than the correct digit 3, the interdigit pulse counter would have been reset by the first interdigit pulse rather than being advanced by it to a count of 1. Because of such reset, the interdigit pulse counter would never have obtained a final count of 3 in response to the incorrect code number 224. Thus, it is clear that the attainment by the interdigit pulse counter of the count of 3 is a reliable indicator that the correct code number has been received and can be used to generate a suitable recognition signal.

It should be recognized that a conventional counter has a series of output lines or conductors which can be designated as its '0', '1', '2', etc. output lines which are selectively energized in accordance with the attained count of the counter. Thus, for example, a counter may energize its '5' output line, whenever the counter attains a corresponding count of 5. Each of the other output lines of a counter is energized in the same manner when the counter reaches the corresponding count level.

With this understanding referring to Table 1 it is easy to understand how the control circuitry of a conventional decoder is able to use the digit counter and the interdigit counter, to recognize that a correct digit set has been received and thereby determine whether or not the immediately following interdigit pulse shall be used to advance the interdigit pulse counter (for a correct digit set) or be used instead to reset the interdigit pulse counter (for an incorrect digit set). The decoder control circuitry can effect such recognition by pairing preselected output lines of the two counters and comparing the output voltage levels of the paired output lines for match or disagreement in output energization. For example, referring to Table 1, it is seen that at a time just before the first interdigit pulse arrives, the count of the digit pulse counter should be 3, and the count of the interdigit pulse counter should be 0. Thus, the control circuitry of the decoder can determine what action to take in response to the first interdigit pulse by merely comparing the voltage of the '0' output line of the interdigit pulse counter with the '3' output line of the digit pulse counter. If the voltages of these two output lines are in agreement, this indicates that the first digit set received was a correct digit set and therefore the immediately following interdigit pulse is used to advance the count of the interdigit pulse counter from 0 to 1. Similarly, at the time that the second interdigit pulse arrives, the control determination can be made by comparing the voltages of the '1' output line of the interdigit pulse counter with the '2' output line of the digit pulse counter and advancing or resetting the interdigit pulse counter in accordance with the agreement or disagreement of the output voltages of these two lines. Finally, in response to the third interdigit pulse, the control determination can be made by comparing the output voltages on the '2' output line of the interdigit pulse counter with the '4' output line of the digit pulse counter. If agreement is found between these two output lines, the interdigit pulse counter is advanced to its count of 3 so that its '3' output line is thereby energized by a predetermined voltage. This energization of the '3' output line can be utilized as the required output recognition signal which indicates that the correct code number has been received.

It is evident, therefore, that the presetting of a particular code number in a conventional prior art decoder may be accomplished by providing a plurality of conventional logic gate comparison circuits, each of which may be connected or "strapped" between the appropriate preselected pairs of output wires of the digit pulse counter and the interdigit pulse counter. Each such logic gate is adapted to produce a voltage output corresponding to agreement or disagreement of the counter output leads between which it is interconnected or strapped. The output voltages of all the comparison logic gates are summed in an "or" logic function in a second logic circuit and applied to actuate a transistor switch in accordance with agreement or disagreement of any of the pairs of strapped or interconnected output lines.

A difficulty which is presented in such prior art decoders is that the use of two sets of logic gates for the comparison and summing functions entails a very high parts count for the many semi-conductors and resistances of the logic gates. In addition, in some types of logic gates very precise resistor values may be required. More important, because of the need for summing the outputs of all of the individual logic comparison gates, difficulty is presented with leakage currents and sneak currents which reduce the operating margins of the logic gates and limit the range of operating voltages of the circuit in which satisfactorily reliable operation can be obtained. The high cost, high parts count, and limited operating range of the logic gate system of comparing the output voltages of strapped pairs of counter leads represents a relatively serious deficiency of prior art decoders of the type described.

THE PRESENT INVENTION

In the continuing development of decoders and especially of their discrete or digital circuitry, in recent years mechanical and even transistor counters have been replaced by digital counters which are mechanized completely with complementary semi-conductor circuitry, (as for example, complementary metal oxide semi-conductor or CMOS circuitry) because of the low cost, ready availability, high precision and resistance to electrical noise and pick up which is exhibited by such digital counters.

According to the present invention such counters mechanized with complementary semi-conductor circuitry have yet another feature which can be utilized to great advantage in providing a unique type of control switching circuitry which is free of the disadvantages described heretofore exhibited by prior art logic gate comparison circuitry. Please note that a counter mechanized with complementary semi-conductor circuitry draws very little or no current from its voltage supply in its normal operating state unless one of its output lines is both energized and is connected to a low voltage point which can serve as a sink for current. In the present invention this feature is utilized to provide uniquely improved type of control switching arrangement in which the pairs of output wires of the digit pulse counter and the interdigit pulse counter can be more or less directly connected to each other rather than through a complex logic gating arrangement and agreement or disagreement between the voltage levels of the pairs of interconnected output leads of the counters can be detected by merely monitoring the current being drawn from the power supply of either of the counters. In other words, if a pair of strapped or interconnected output leads of the two counters are both energized and are therefore both at a high voltage level, then neither will draw a current from the other and neither can act as a sink. Thus, it is only upon disagreement between the voltage levels or energizations of matched or strapped pairs of output leads of the two counters that one counter can act as a sink for current flow from the other counter so that substantial current will be drawn by the counters from their power supplies. The current drawn by any one of the counters from its corresponding power supply can therefore serve as a reliable and precise indication of agreement or disagreement between the energization of matched or strapped pairs of output leads of the two counters.

In one preferred embodiment of the invention which will be described in more detail herebelow, the power voltage and current for the interdigit pulse counter is supplied through the emitter base junction of a transistor switch so that, whenever disagreement between matched pairs of output lines occurs, current is drawn by the interdigit pulse counter through the emitter base connection of the transistor switch, this having the effect of energizing the transistor switch and permitting it to control the resetting of the interdigit pulse counter in accordance with the sequencing requirements which have been herebefore described in connection with Table 1. The use of such method and apparatus for the monitoring of agreement or disagreement between pairs of matched output leads of the two counters has permitted the elimination of large numbers of components and has greatly improved the preciseness, reliability, and range of operation of the decoder circuitry of the present invention.

DESCRIPTION OF THE PREFERRED EMBODIMENT

Figure 1:
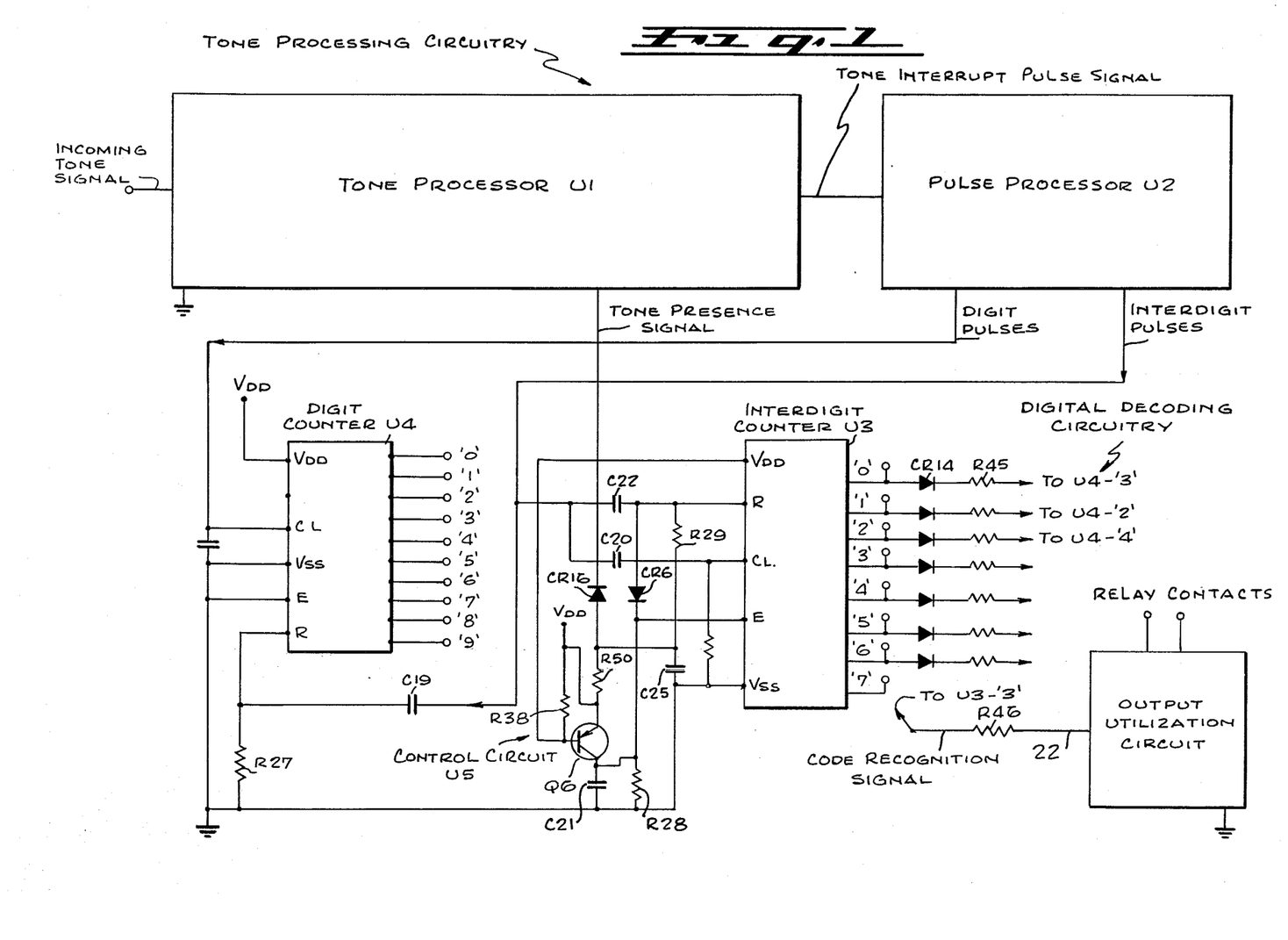
FIG. 1 is a partly block, partly circuit diagram of a decoder according to the present invention.

Referring now to FIG. 1, there is shown a partly block, partly circuit diagram of a preferred embodiment of a decoder according to the present invention. As shown in FIG. 1, the decoder includes two major portions, the first portion comprising tone processing circuitry which is shown in the top portion of FIG. 1 and includes a tone processor U1 and a pulse processor, U2. The second major portion of the decoder comprises digital decoding circuitry which is shown in the lower portion of FIG. 1, and is seen to comprise a digit counter U4, an interdigit counter U3, and a control circuit U5 which includes a transistor switch Q6 and associated control circuitry which couples the transistor Q6 to the interdigit counter U3 for the control of the count and reset operations of counter U3.

The final output of the digital decoding circuitry and of the decoder as a whole is an output code recognition signal which is applied over an output conductor 22 to a suitable output utilization circuit whenever a correct code number has been received by the decoder. The output utilization circuit responds to the code recognition signal whenever it appears to close a pair of relay contacts which are made available on a pair of output leads of the utilization circuit and can be used to energize signal lights or horns or other external apparatus which is intended to be responsive to the appearance of a code recognition signal.

With respect to the embodiment of the decoder of the invention which is shown in FIG. 1, it will be assumed for purposes of example that it has been preset to recognize the incoming code number 324 as its correct code number and that it will therefore produce the code recognition signal on output conductor 22 only when it receives a pattern of tone interrupts corresponding to the code number 324. The strapping connections between the output lines of the interdigit counter U3 and the output lines of the digit counter U4 will therefore be described as they would be connected for the recognition of the code number 324, and in similar manner the strapping connection of the output conductor 22 on which the code recognition signal appears to an output lead of interdigit counter U3 will be described as would be appropriate for the recognition of a three digit code. It will be evident however that the decoders may be strapped or preset to recognize any desired preselected multidigit code within its capacity.

Referring first, however, to tone processing circuitry of the decoder of FIG. 1, it is seen that the incoming tone signal with its pattern of tone interrupts is applied as an input signal to tone processor U1 which operates on the incoming tone signals to produce as corresponding output signals a tone presence signal which is applied to the tone circuit U5 and a tone interrupt pulse signal which is applied as an input signal to the pulse processor U2.

Figure 2:
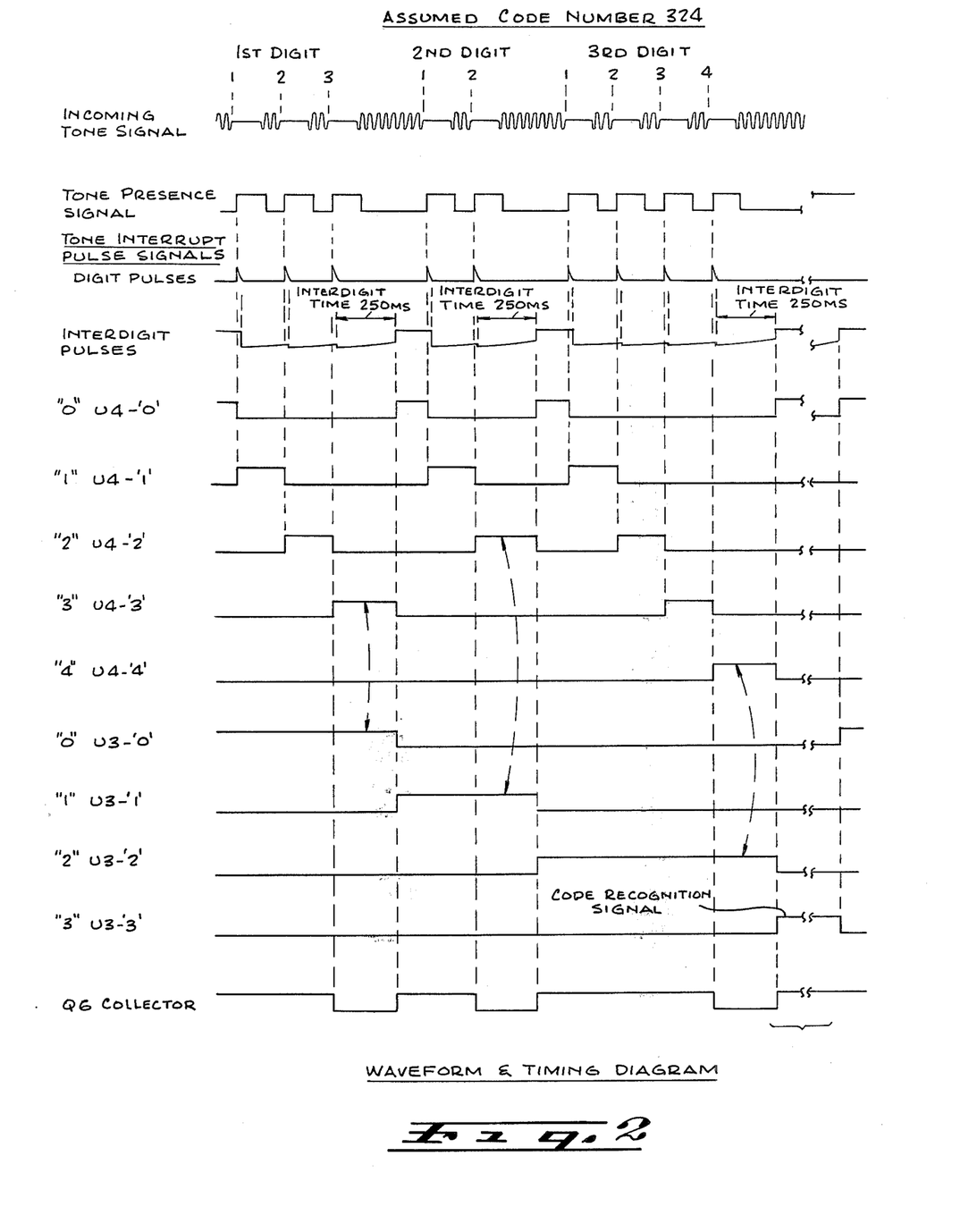
FIG. 2 is a timing diagram illustrating on a common time scale the appearance of the wave forms of signals generated in the operation of the decoder of FIG. 1.

Referring to FIG. 2, the wave form of the incoming tone signal is shown for the assumed correct code number 324 and is shown to comprise a tone signal which has been switched on and become continuous and is then interrupted in a pattern, first of three interrupts, then a pause, then two interrupts then a pause, and then four interrupts followed by a pause, all which is required by the conventional telephone code representation of the code number 324. The corresponding output wave form, produced by the tone processor U1, of the tone presence signal is also shown in FIG. 2 and is seen to be a wave form which is at a high voltage level whenever the incoming tone signal is interrupted and is otherwise at a low voltage level. Tone processor U1 will be understood to comprise a conventional tone processing circuit and may be considered for example to comprise an amplifier which amplifies the incoming tone signal and feeds it to a tone filter which in turn feeds it to a detector and then to the input of a Schmidt trigger which is triggered so that its output follows the interrupts and reestablishments of the tone signal so as to generate the tone presence signal as illustrated in FIG. 2. The tone processor U1 may also be considered to include a differentiator and succeeding amplifier which operates upon each leading edge of the tone presence signal to produce a corresponding train of sharp output pulses which constitute the tone interrupt pulse signal as shown in FIG. 2, each sharp positive pulse representing the corresponding tone interrupt and the pattern of such pulse signals representing the digit sets of the first, second, and third digit of the incoming code number 324.

The pulse processor U2, which is considered to be conventional in the art, amplifies, with a slight transit delay, the incoming tone interrupt pulse signals so as to serve as the required digit pulses, and for this reason as shown in FIG. 2, the same wave form is used to illustrate both the tone interrupt pulse signals and the digit pulses. The pulse processor U2 also responds to the tone interrupt pulse signals to generate the required interdigit pulses whose wave form may be as shown in FIG. 2, each positive interdigit pulse starting after a delay of about 250 miliseconds after the completion of the last digit pulse of the preceding digit pulse set and continuing until terminated by the first digit pulse of the immediately succeeding digit pulse set. Thus, as shown in FIG. 2, the digit pulses and pauses of the incoming code 324 permit the production of three interdigit pulses, the first interdigit pulse occurring in the pause following the appearance of the first digit set, the second interdigit pulse occurring in the pause following the appearance of the second interdigit set, and the third interdigit pulse occurring in the pause following the appearance of the third digit set of digit pulses. As is conventional in the prior art, the interdigit pulses may be produced by pulse processing circuitry which utilizes the tone interrupt to inhibit the production of an output pulse by a monostable multi-vibrator. When the digit pulses cease at the completion of a digit set, the monostable multivibrator recovers from its inhibition after a suitable delay time and begins to produce and output signal corresponding to the interdigit pulse, until it is again inhibited (i.e. set to its unstable state) by the first digit pulse of the next digit set.

As before noted the three output signals of the tone processing circuitry, namely the tone presence signal, the digit pulses, and the interdigit pulses, are applied to the digital decoding circuitry to effect the recognition or decoding operation.

Referring in more detail to the digital decoding circuitry, as illustrated in FIG. 1, digit counter U4 may be any conventional fully complementary semi-conductor digital counter, as for example the complementary metal oxide semi-conductor (CMOS) counter chip no. CD4017AE manufactured by Radio Corporation of America. Similarly the interdigit counter U3 may be a conventional complementary semi-conductor counter such as the complementary metal oxide semi-conductor (CMOS) counter chip CD4022AE manufactured by Radio Corporation of America. These exemplary counter chips are described in detail in the catalog entitled RCA Solid State 74 Databook, SSD-243B copyright 1973 distributed by RCA Solid State Division, Box 3200, Somerville, N.J. 08876. Each such counter chip has a complete digital counter mechanized thereon in completely complementary semi-conductor circuitry. Each such counter includes counting flip-flops, counter input gates, and also counter output gates which respond to the states of the counter flip-flops to energize a particular output line in accordance with the state or obtained count of the counter.

Thus, for example, the decade digit counter U4 has a series of ten output lines designated as its '0', '1', '2', '3', '4', to '9' output lines. The '0' line is energized with a high voltage level when the counter has attained or been reset to a count of 0. The '1' output line is energized with a high voltage level when the counter obtains a count of 1 and so forth. The counter thus acts as a type of distributor which selects and energizes a particular one of its '0' through '9' output lines in accordance with and matching the count 0 through 9 which the counter may have attained.

The digit counter U4 also has five inputs which are utilized in the present digital decoding circuitry. These inputs are its $V_{DD}$, CL, $V_{SS}$, E, and R inputs. The $V_{DD}$ input is adapted to receive the "high" voltage supply of the counter chip from a source of voltage $V_{DD}$. The $V_{SS}$ input is adapted to receive the "low" voltage supply of the chip from a source of relatively low voltage $V_{SS}$, and is shown in FIG. 1 as being connected to ground which serves as the $V_{SS}$ input both for digit counter U4 and interdigit counter U3. The CL input, or clock input, is adapted to receive positive going clock pulses, and the counter U4 will respond to each such count or clock pulse by advancing its count by a unit increment, as for example, from a count of '0' to a count of '1' and so forth. However, the digit counter U4 will respond to a clock or count pulse applied to its CL input only if a low logic level voltage is applied to its E or Enable input. If a high (logic level) voltage is supplied to the E input, this has the effect of inhibiting the responsiveness of the counter to the clock input to CL so that the counter will then not advance its counter. For digit counter U4, as shown in FIG. 1, the E or Enable input is connected directly to ground, so that the digit counter U4 is permanently enabled and will be permanently responsive to any clock or count pulses that are applied to its CL input.

The R input of digit counter U4 is a Reset input and the digit counter U4 will be reset to its zero state or count whenever a positive going pulse is applied to its R or Reset input.

As shown in FIG. 1, the digit pulses are applied to the CL input of digit counter U4 and the interdigit pulses are applied through a capacitor C19 (and across a resistor R-27) to the R input or Reset input of digit counter U4. Thus, in overall operation the digit counter U4 simply operates to count the digit pulses of each set, and is thereafter reset after each digit by the following interdigit pulse which occurs in the pause between the digit sets. This operation of digit counter U4 is repeated endlessly in repsonse to each digit set which is received. Thus, for example, in response to the digit pulses which represent the code number 324, the digit counter U4 will first count to a count of 3 so as to energize its '3' output line, then will be reset to 0 by the following interdigit pulse, then will count to a count of 2 so as to energize its '2' output line and will be reset to 0 by the following interdigit pulse, and finally will count to a count of 4 so as to energize its '4' output line and will thereafter be reset to 0 by the third and final interdigit pulse of the incoming code number, 324. This operation of the digit counter U4 and its energization of its output lines is illustrated in the timing diagram of FIG. 2 in which the voltage wave forms appearing on the output lines 0 through 4 of digit counter U4 are shown on a common time scale as they appear in response to the digit pulses and interdigit pulses of the incoming code number 324.

The interdigit counter U3 similarly has a sequence of output lines '0', '1', – '7' which are energized at a high voltage level to identify the 0, 1, 2, etc. through 7 counts of interdigit counter U3. It is assumed as beforedescribed that the strapping connections of interdigit counter U3 are made so as to recognize code number 324 as its correct number. Therefore in accordance with the strapping or interconnection requirements which have been discussed before in connection with Table 1 of the introduction to this specification, the '0' output line of interdigit counter U3 is connected through an isolating diode CR-14 and a resistance R-45 to the '3' output line of digit counter U4; the next or '1' output line of interdigit counter U3 is similarly strapped or connected through an isolating diode and resistor to the '2' output line of digit counter U4; and the '2' output line of interdigit counter U3 is connected through an isolating diode and resistor to the '4' output line of digit counter U4. As will be later explained in more detail the interdigit counter U3 will advance through its counts 0, 1, and 2 and finally obtain a count of 3, only if three successive correct digit sets are received by the decoder. Thus the high voltage energization of the '3' output line of interdigit counter U3 can thereby serve as the required code recognition signal, signifying that the preset or correct code number 324 has been received. For this reason, output conductor 22 is shown in FIG. 1 as being connected through a buffering resistor R-46 to the '3' output line of interdigit counter U3 completing the required strapping connections to establish the responsiveness of the decoder of FIG. 1, to the preselected code number 324.

As further shown in FIG. 1, the $V_{DD}$ or high voltage power input of interdigit counter U3 is not connected directly to the high voltage source $V_{DD}$, but is instead connected to the source $V_{DD}$, both through a resistor R-38 and through the emitter-base junction of the transistor switch Q6. The collector of transistor switch Q6 is connected in parallel to the capacitor C-21 and a resistor R-28 to ground. The transistor switch Q6 is normally nonconducting so that its collector is at ground level, its emitter is at the high voltage $V_{DD}$, and the base emitter junction is non-conducting so that the voltage $V_{DD}$ is supplied to the $V_{DD}$ input of the interdigit counter solely through the resistor R-38. However, whenever and if the interdigit counter U3 draws substantial current from the source of $V_{DD}$ through resistor R-38, the resultant voltage drop across the resistor R-38 will have the effect of forward biasing the emitter-base junction of transistor switch Q6, thereby rendering transistor switch Q6 fully conductive so that its collector rises to a relatively high voltage, close to $V_{DD}$ and power is supplied to the $V_{DD}$ input of interdigit counter U3 both through R-38 and through the emitter-base junction of Q6. This described operation of transistor switch Q6 is utilized, as will be later explained, to control, in the manner required, the selection of either counting or resetting of interdigit counter U3 in response to the application of the successive interdigit pulses of the incoming code number 324.

We have to consider now in a somewhat coordinated manner the connections of control circuit U5 to R (Reset), CL (Clock or count) and E (Enable) inputs of interdigit counter U3. Note that the interdigit pulses are applied through a capacitor C-22 to the R or Reset input of interdigit counter U3, and also are applied in parallel therewith through capacitor C-20 to the CL input which is the clock or count input of interdigit counter U3. Now obviously we do not want or expect interdigit counter U3 to simultaneously both reset and count in response to the appearance of an interdigit pulse, and what is actually done is that the interdigit pulse is gated so as to be inhibited on the R (Reset) input and enabled on the CL or clock input of interdigit counter U3. In this matter, note that the collector of transistor switch Q6 is connected directly to the E (Enable) input of interdigit counter U3 and also through a diode CR-6 to the input line to the R or Reset input of interdigit counter U3. When transistor Q6 is not conducting, as is its normal state in the absence of current draw by interdigit counter U3, its collector is low, and substantially at ground potential so that the E (Enable) input of counter U3 is in fact enabled thus, enabling the counter to respond to the interdigit pulse at the CL input of the counter. At the same time in response to this same low collector voltage of transistor switch Q6, the interdigit pulses which are trying to reach the R input are instead shunted to the ground potential of capacitor C-21 by the (conductive) gating diode CR-6. Thus, in normal operation (so long as only correct digit sets have been received) interdigit pulses are enabled at the CL input of counter U3 and inhibited or shunted to ground at the R or reset input of counter U3, so that the counter U3 will continue to count each arriving interdigit pulse so long as correct preceding digit sets are received.

In addition to this main or primary function of the control circuit U5 in gating incoming interdigit pulses selectively to either the CL or R inputs of counter U3, the control circuit U5 also has some secondary preparatory or housekeeping functions which will now be described. Note that the voltage source $V_{DD}$ which is connected to the emitter of transistor switch Q6 is also connected through a resistor R-50 (across capacitor C-25) and through a resistor R-29 to the R or Reset input of counter U3. Note, also, that the tone presence signals are applied through a diode CR-16 to the common connection on point of resistor R-50 and capacitor C-25. It will be remembered that the tone presence signal is low whenever tone is present. Thus, if tone is present, the described connection of the tone presence signal will have the effect of causing any charging voltage which would otherwise tend to accumulate on capacitor C-25 to be discharged through diode CR-16 into the source of the low level tone presence signal. Thus, the voltage across capacitor C-25 will remain close to ground so long as the tone signal is present and this voltage will not be able to interfere in any way with the R or Reset input of counter U3. However, whenever the incoming tone signal is shut off the tone presence signal rises to a relatively high level rendering the diode CR-16 non-conductive and out of circuit, so that the charging voltage across C-25 can then rise to the full level of the $V_{DD}$ voltage at a rate determined by the RC time constant of the charging circuit. This rising charging voltage of capacitor C-25 will eventually reach a level at which it will be sufficient to directly act as a reset signal for interdigit counter U3. Thus, the overall effect of the charging circuit associated with capacitor C-25 and the R or Reset input is to automatically reset counter U3 at any time that the incoming tone signal is shut off or withdrawn for a sufficient period of time. This automatic reset will not operate in response to the relatively short periods of tone interrupt during a code number transmission but will be activated when the incoming tone is totally shut off or withdrawn. This feature allows the operator of the transmittor to reset the counters in all decoders by merely switching off tone transmission for a period before beginning transmission of a new code number.

We have now completed a large portion of the description of the digital decoding circuitry of the decoder of FIG. 1, and it is now possible to fully trace through the operations of the digital decoding circuitry in response to an incoming correct code number, 324 and to understand the corresponding signal wave forms of the decoder as illustrated in FIG. 2. As before described in connection with FIG. 2, for the assumed code number 324 the digit pulses will comprise a pattern of first three successive pulses, and then a pause, then two successive pulses and then a pause, and then four successive pulses and a pause. As further illustrated in FIG. 2 an interdigit pulse occurs approximately 250 miliseconds after each digit set so that there will be three interdigit pulses directly associated with this code number the first occurring in the pause following the digit set representing the digit 3, the second interdigit pulse occurring in the pause following the digit pulses of the digit set representing the digit 2, and the third interdigit pulse occurring in the pause following the appearance of the four digit pulses representing the digit 4. The wave form and timing diagram of FIG. 2 is shown as broken or discontinuous immediately after the appearance of the 3rd interdigit pulse to signify the passage of a period of time in which an unknown digit set may appear before the last interdigit pulse shown on the diagram.

The counters U3 and U4 are assumed to be initially at their 0 counts so that as shown in FIG. 2 the '0' output line of counter U4 and the '0' output line of counter U3 are both high. In response to the first three digit pulses, the counter U4 is advanced sequentially to its 1, 2, and 3 counts so that its '3' output line is energized (high) as shown in FIG. 2 at the beginning of the first pause following the first digit set. Meanwhile the interdigit pulse counter U3 has remained at its 0 count awaiting the arrival of the first interdigit pulse. Thus, at a time during the first pause immediately before the arrival of the first interdigit pulse, both the '0' output line of counter U3 and the '3' output line of counter U4 are energized and are both at a high voltage level as indicated in FIG. 2. These two output lines of the two counters are strapped or connected together (indicated by their dotted line double arrow as shown in FIG. 2) as herebefore described, but because they are both energized the '3' output line of digit counter U4 does not draw any current whatsoever from the '0' output line of interdigit counter U3. Thus, very little current is drawn from interdigit counter U3 at this time from the source $V_{DD}$ and therefore transistor switch Q6 will have its collector go low (as shown in FIG. 2) and will therefore function, in relation to the first interdigit pulse when it appears, to inhibit the application of the interdigit pulse to the R or Reset input and enable its application to the CL clock or count input of counter U3. In response to the first interdigit pulse the counter U3 is therefore successfully counted or advanced from a count of 0 to a count of 1 at which its '1' output line is thereby energized as shown in FIG. 2.

This operation of the counters U3 and U4 is then repeated in response to the next set of digit pulses representing the digit 2; and then is again repeated in response to the final set of four digit pulses representing the digit 4. In this manner the interdigit counter U3 is advanced at the appearance of the second interdigit pulse to a count of 2 at which its '2' output line is energized at a high level as shown in FIG. 2, and then is finally advanced by the third interdigit pulse to a count of 3 at which its '3' output line is energized as further shown in FIG. 2. In accordance with the strapping requirements, the '3' output line of interdigit counter U3 is connected to the code recognition signal output conductor 22, and in this manner the high voltage signal appearing on the '3' output conductor serves as the required code recognition signal when counter U3 is successfully advanced to a count of 3 in response to a correct incoming code 324.

It will be noted that if any pair of strapped or interconnected output lines had been in disagreement (i.e. the line of U3 high and the paired line of U4 low) when the interdigit pulse arrived, the interdigit counter U3 would have been drawing substantial current from transistor switch Q6, and transistor Q6 would then have been forwarded biased to become conductive and thereby control the interdigit pulse when it appears to apply it to the R or Reset input of counter U3 and thus reset counter U3 so that it cannot reach its peak attained count of 3. Thus, the effect of any incorrect digit in an incoming code is to reset counter U3 before it can reach its required peak count and thereby prevent the issuance of a code recognition signal.

It will also be recognized that the interdigit counter does not get locked in place once it reaches the peak count at which it issues a code recognition signal, but is instead automatically reset so that it is returned to a starting position at which it will be able to monitor further incoming code numbers. This is accomplished in either one of two ways. Firstly, if the incoming tone signal is shut off by the operator of the transmitter, this will have the effect of resetting the interdigit counter U3 (by means of the charging circuit associated with the capacitor C-25) in the manner already described. Even if the incoming tone signal is left on, the interdigit counter will be reset by the next interdigit pulse (the last interdigit pulse shown on the timing diagram of FIG. 2) for the reason that at the time of appearance of this next interdigit pulse, counter U3 will still have its '3' output line energized. Since the '3' output line is connected to the output conductor 22 and through it to the relatively low output impedance of the output utilization circuit, this forms a current pah through which substantial current is withdrawn from counter U3, thus causing reset of counter U3 in response to the next appearing interdigit pulse in the manner previously described. If for any reason this reset fails, a later incorrect digit set will also cause automatic reset.

Figure 3:
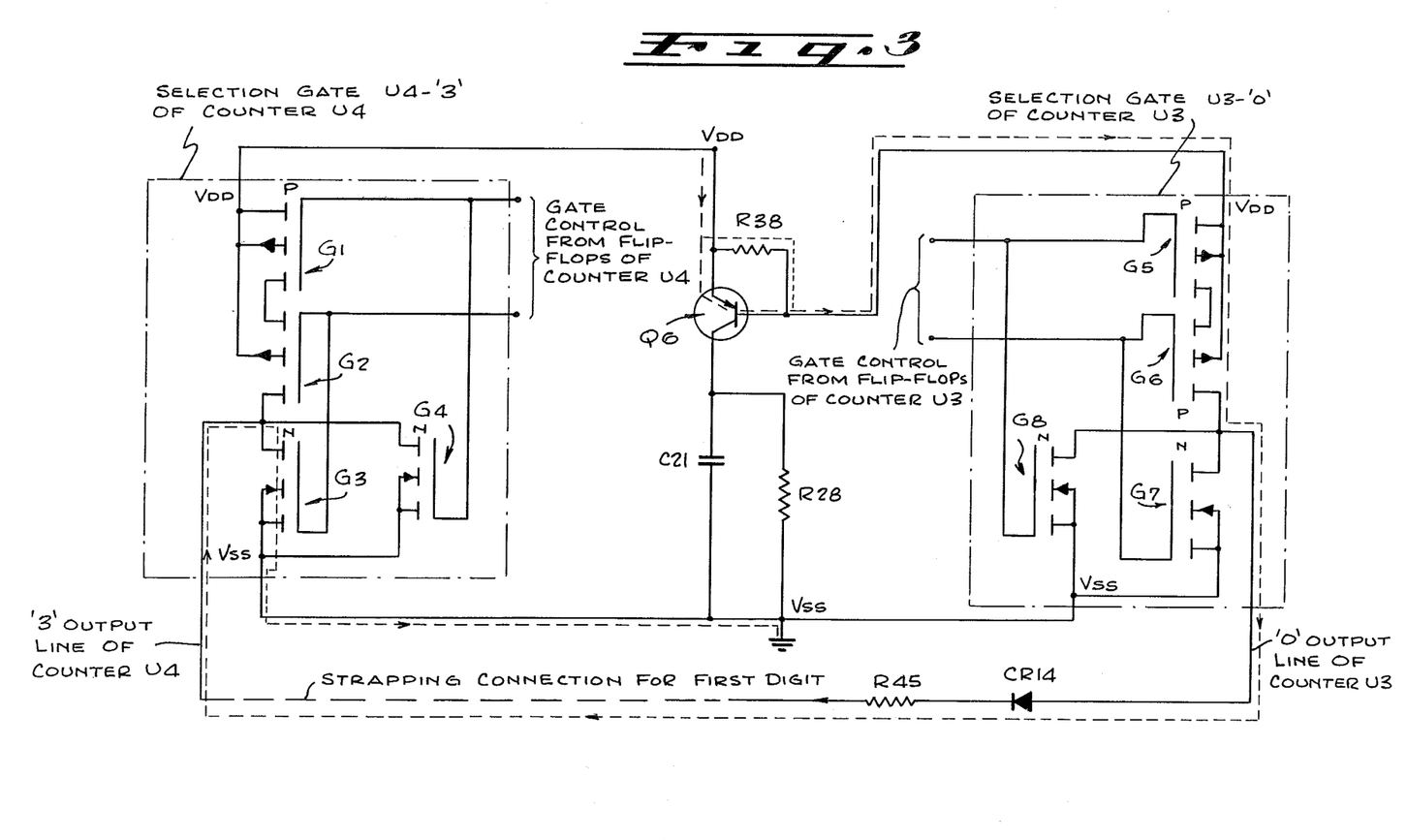
FIG. 3 is a circuit diagram showing in more detail the manner in which a transistor control switch is connected to supply power supply voltage current to the output circuitry of the interdigit pulse counter.

In the foregoing description, operation is predicated upon the fact that the complementary semi-conductor counter U3 draws relatively low current in its internal circuitry and only draws substantial current from its power supply when such current is being withdrawn by one of its output lines which is connected to a sink for such output current. This is a condition which is true of counters which are entirely mechanized with complementary semi-conductor circuitry. In order to clarify the manner in which the unique properties of a complementary semi-conductor counter are utilized in cooperation with transistor switch Q6, there is provided in FIG. 3 a circuit diagram which shows by way of example a suitable embodiment of that internal selection gate of interdigit counter U3 which energizes the '0' output line of counter U3 (this output gate being designated as selection gate U3-'0'). FIG. 3 also shows a suitable corresponding embodiment of the internal selection gate (designated as selection gate U4-'3') of digit counter U4 which energizes the '3' output line of counter U4. FIG. 3 also shows the path for current flow which is established between these gates and through transistor switch Q6 when the '0' output line of counter U3 is strapped or connected to the '3' ouput line of counter U4 as is required for the decoding of the first digit of the selected output code 324.

As is indicated in FIG. 3, selection gate U3-'0' of counter U3 is a conventional CMOS and gate which receives its gate control from the counting flip-flops of counter U3 and operates to energize the '0' output line of counter U3 whenever the counter U3 attains a count of 0. It is assumed that at such time the gate U3-'0' will recieve simultaneous high voltage inputs on its gate control lines. It is clear referring to selection gate U3-'0' that quite independent of the values of the gate control voltages, there can be no conduction of current from its high voltage supply input $V_{DD}$ to its low voltage supply $V_{SS}$. This is because, as is conventional with complementary semi-conductor circuits, the current path from the high voltage supply $V_{DD}$ to the low voltage supply $V_{SS}$, is through a set of P channel MOS devices in series with a set of N channel MOS devices. Any gate control voltage which is applied to a P channel device is also applied to a corresponding N channel device. As a result of this type of structure any gate control voltage that renders an N channel device conductive will at the same time render the corresponding P channel device non-conductive so that no current whatsoever can flow through the gate from $V_{DD}$ to $V_{SS}$. Thus, in the absence of an external current path, as for example through the '0' output line, the gate U3-'0' will draw very, very little or no current from its $V_{DD}$ supply voltage.

It should be understood that this feature of very, very low current drain is characteristic of complementary semi-conductor devices and that a digital counter which is composed entirely of such devices will similarly draw very little or no current whatsoever from its high voltage supply unless a current path is established through an output line of the digital counter.

We will now consider for purposes of example the current path which is established through the '0' output line of counter U3 when it is strapped to the '3' output line of counter U4 and there is disagreement or mismatch between these two lines (i.e. the '0' of counter U3 is energized or at a high voltage level while the '3' output line counter U4 is not energized and is at a low voltage level).

Note that the '0' output line of counter U3 is connected within selection gate U3-'0' to the common junction point of the P channel devices and the N channel devices. When the '0' output line is high, this indicates that the P channel devices have been rendered conductive so that the '0' output line is directly connected to the $V_{DD}$ supply voltage, while at the same time the N channel devices have been rendered non-conductive so as to isolate the '0' output line from the low $V_{SS}$ supply voltage. In this manner, a possible current path is established from the source of the supply voltage $V_{DD}$, through the P channel devices to the '0' output line of counter U3, rendering this '0' output line energized at a high voltage level. In the same manner the fact that '3' output line of counter U4 is at a nonmatching low voltage level indicates that within selection gate U4-'3' the N channel devices or at least one of them is conductive while at least one of the P channel devices is non-conductive, thus isolating the '3' output line of counter U4 from the high voltage supply $V_{DD}$ and directly connecting it to the low voltage supply $V_{SS}$. In this manner a possible path for current flow is established through the '3' output line of counter U4 through the N channel devices to the source of voltage $V_{SS}$.

It is therefore clear that in the presence of a strapping connection, as shown by the dotted line in FIG. 3, between the '0' output line of counter U3 and the '3' output line of counter U4, a current path is established through which current can flow from the source $V_{DD}$ through the emitter base-diode of transistor switch Q6 through the P channel devices of gate U3-'0' and then through the '0' output line of counter U3 and the '3' output line of counter U4, through the N channel devices of gate U4-'3' and finally to the source of the voltage supply $V_{SS}$. This described current path is shown in FIG. 3 by a continuous dotted line which is drawn from $V_{DD}$ to $V_{SS}$ along the described route. In this manner upon mismatch of the strapped output lines, the '3' output line of counter U4 serves as a sink connection for current which is supplied to counter U3 from $V_{DD}$ through the base emitter connection of the transistor switch Q6.

If we assume, for purpose of further illustration, that the two strapped ouput lines were matched or agreed in output voltage, then it is clear that no current would flow from one line to another because of the equipotential of these lines. In addition the poleing of diode CR-14 assures that there will only be current flow when the '0' output line of counter U3 is at a higher voltage level than the '3' output line of counter U4 and not in the converse condition. It is thus evident overall that current flow will be established through transistor switch Q6 when the pair of output lines are strapped together and are mismatched in voltage level with the '0' output line of counter U3 at a high level and the '3 output line of counter U4 at a low level.

In this manner, we are able to see in greater detail and with greater understanding how the required switching operations of transistor switch Q6 are effected in cooperation with the unique properties of the strapped or interconnected complementary semiconductor counters.

What is claimed as new is:

1. Detection apparatus for indicating when a semiconductor digital counter has been advanced to a count at which a then energized one of its output conductors is connected to a current accepting source of bilevel voltage, said apparatus comprising:

a semi-conductor digital counter capable of being sequentially advanced through a plurality of counts, said digital counter having a plurality of output conductors which are selectively energized in a configuration representing the then attained count of said counter, each of said conductors having a bilevel voltage thereon which is at a first level when said output conductor is energized, said digital counter drawing substantial current from its main operating voltage supply only when such current is withdrawn from said counter through one of its said output conductors;

means for connecting each of said plurality of output conductors of said digital counter to a corresponding source of bilevel voltage, each said source of bilevel voltage being capable of withdrawing substantial current from an energized output conductor of said digital counter when the output voltage of said source is at the second of said bilevel voltages;

supply voltage means for supplying to the digital counter its main operating supply voltage;

detection circuit means coupled to said supply voltage means, said detection circuit means including a switching circuit means, said further including apparatus responsive to substantial current flow from said supply voltage means to said digital counter for changing the state of said switching circuit means; and count means for incrementally advancing said digital counter to sequentially energize selected conductors of its output conductors in a configuration representing the attained count of said counter, whereby the changed state of said switching circuit means indicates that said counter has been advanced to a count at which a then energized one of its output conductors is connected to a current accepting source of bilevel voltage.

2. The apparatus defined by claim 1 wherein said digital counter is wholly composed of complementary semiconductor digital circuits which do not draw substantial current from the digital counter's operating voltage supply unless such current is externally withdrawn from output conductors of said digital circuits.

3. The apparatus defined by claim 1 which further includes a second semiconductor digital counter having output conductors selectively energized in a configuration representing the attained count of said second counter, a plurality of said sources of bilevel voltage comprising predetermined output conductors of said second digital counter, whereby the changed state of said switching circuit means indicates lack of agreement between the voltage levels of interconnected conductors of said first and second counters.

4. The apparatus defined by claim 3 which further includes control apparatus for selectively resetting or advancing said first counter in accordance with the state of said switching circuit means.

5. The apparatus defined by claim 4 which includes circuit means for cyclically advancing said second counter to independent attained counts in successive independent count cycles of said second counter, said control apparatus being operable after each count cycle of said second counter for selectively resetting or advancing said first counter in accordance with the state of said switching circuit means, whereby continued advancing of said first counter is dependent on the sequence of attached counts reached by said second counter in successive count cycles thereof.

6. The apparatus defined by claim 1 wherein said detection circuit means is intercoupled between said supply voltage means and said digital counter, a portion of any substantial current flow from said supply voltage means to said counter flowing through said switching circuit means to change the state of said switching circuit means.

7. The apparatus defined by claim 1 wherein said switching circuit means comprises a transistor switching amplifier having its base-emitter junction intercoupled between said supply voltage means and said digital counter to supply current therethrough from said supply voltage means to said digital counter when substantial current is drawn by said digital counter, said transistor switching amplifier being biased by any substantial current flow therethrough to change its conduction state.

8. Decoder apparatus for recognizing the digits of a preselected code number, each digit of said code number being represented by a corresponding incoming sequential set of digit pulses, said decoding apparatus comprising:
- a first complementary semiconductor digital counter having a plurality of output conductors having bilevel voltages thereon, said digital counter selectively energizing selected conductors of its output conductors at a first level of the bilevel voltage in a configuration representing the then attained count of said counter;
- a second counter having a plurality of second output conductors having bilevel voltages thereon, said second counter selectively energizing said second output conductors at said first level of the bilevel voltage in a configuration representing the attained count of said second counter;
- means for applying each incoming set of digit pulses to said second counter to advance said second counter to a count corresponding to the digit represented by the applied set of digit pulses;
- means for connecting an output conductor of said first counter to that output conductor of the second counter which would be energized if the digit set applied thereto represented a correct digit of the preselected code number;
- supply voltage means for supplying a predetermined one of said first and second counters with a main operating supply voltage;
- switching means coupled to said supply voltage means and responsive to substantial current flow from said supply voltage means to said predetermined one of said counters for producing a bilevel switching signal having one level when substantial current is drawn from said supply voltage means by said predetermined one of said counters and a second level when substantial current is not drawn thereby;
- and means intercoupling said first counter and said switching means and responsive to said switching signal for selectively advancing or resetting said first counter in accordance with the level of said switching signal.

9. The decoder apparatus defined by claim 8 in which in the representation of the digits of an incoming code number each set of digit pulses is followed by an interdigit pulse which marks the time space between receipt of successive digits of the code number, each interdigit pulse being applied to said second counter to reset said second counter after it has been advanced to a count by the preceding set of digit pulses, said means intercoupling said first counter and said switching means, said switching means including apparatus for receiving each interdigit pulse and selectively applying the interdigit pulse to said first counter to advance or reset said first counter in accordance with the level of said switching signal.

10. The decoder apparatus defined by claim 8 wherein said predetermined one of said first and second counters comprises said first counter.

11. The apparatus defined by claim 8 wherein said predetermined one of said digital counters is wholly composed of complementary semiconductor digital circuits which do not draw substantial current from said predetermined digital counter's operating voltage supply unless such current is externally withdrawn from output conductors of said digital circuits.

12. The apparatus defined by claim 8 wherein said switching means is intercoupled between said supply voltage means and said predetermined one of said digital counters, a portion of any substantial current flow from said supply voltage means to said predetermined one of said digital counters flowing through said switching means to change the state of said switching means from a first state to a second state, said switching means producing said bilevel switching signal at said one or second level in accordance with the state of said switching means.

13. The apparatus defined by claim 8 wherein said switching means comprises a transistor switching amplifier having its base-emitter junction intercoupled between said supply voltage means and said predetermined one of said digital counters for supplying current therethrough from said supply voltage means to said digital counter when substantial current is drawn by said digital counter, said transistor switching amplifier being biased by any substantial current flow therethrough to change its conduction state.

14. The method of using a wholly complementary semiconductor digital counter to detect whether any of a plurality of current accepting sources of bilevel voltage has a predetermined voltage level, said method comprising the steps of:
   a. connecting a plurality of output conductors of the digital counter to corresponding ones of said plurality of sources of bilevel voltage;
   2. supplying to the digital counter its main operating supply voltage;
   3. incrementally advancing the digital counter to sequentially energize its output conductors in a configuration of bilevel voltages representing the then attained count of the counter; and
   4. producing a predetermined detection signal when a substantial current is drawn from its main operating voltage supply by the digital counter;
   whereby the presence or the absence of the predetermined detection signal after each count of the counter indicates if a then energized one of the output conductors of said counter is connected to a source of bilevel voltage which is at a voltage level at which the source draws substantial current from the digital counter.

15. The method defined by claim 14 which further includes the additional step of resetting the counter when the detection signal is produced.

16. The method defined by claim 14 wherein said step of producing a predetermined detection signal includes the step of changing the state of a switching circuit to generate the detection signal as an output signal of the switching circuit when a substantial current is drawn from the digital counter's main operating voltage supply by the digital counter.

17. The method of using a wholly complementary semiconductor digital counter to detect whether any of a plurality of sources of voltage has a voltage level at which the source will accept substantial current from an output conductor of the digital counter, said method comprising the steps of:
   1. connecting a plurality of output conductors of the digital counter to corresponding ones of said plurality of sources of voltage;
   2. supplying to the digital counter its main operating supply voltage;

3. incrementally advancing the digital counter to sequentially energize its output conductors in a configuration of bilevel voltages representing the then attained count of the counter; and 4. producing a predetermined detection signal when a substantial current is drawn from its main operating voltage supply by the digital counter;

whereby the presence or the absence of the predetermined detection signal after each count of the counter indicates if a then energized one of the output conductors of said counter is connected to a source of voltage which is at a voltage level at which the source draws substantial current from the digital counter.

18. Detection apparatus for indicating when a digital logic circuit has been set to a state at which a then energized one of its output conductors is connected to a current accepting source of bilevel voltage comprising:

a semi-conductor digital logic circuit settable to a plurality of internal states and wholly composed of a plurality of complementary semiconductor digital circuits having a common supply of main operating voltage, said digital logic circuit having a plurality of output conductors which are selectively energized in a configuration corresponding to the then existing internal state of said logic circuit, each of said conductors having a bilevel voltage thereon which is at a first level when said output conductor is energized, said digital logic circuit drawing substantial current from its main operating voltage supply only when such current is withdrawn from said logic circuit through one of its said output conductors;

means for connecting predetermined ones of said plurality of output conductors of said digital logic circuit to a corresponding source of bilevel voltage, each said source of bilevel voltage being capable of withdrawing substantial current from an energized output conductor of said digital logic circuit when the output voltage of said source is at the second of said bilevel voltages;

supply voltage means for supplying to the digital logic circuit its main operating supply voltage;

detection circuit means coupled to said supply voltage means, said detection circuit means including a switching circuit means, and further including apparatus responsive to substantial current flow from said supply voltage means to said digital lotic circuit for changing the state of said switching circuit means; and, whereby the changed state of said switching circuit means indicates that said logic circuit has been set to a state at which a then energized one of its output conductors is connected to a current accepting source of bilevel voltage.

19. The method of using a wholly complementary semiconductor digital logic circuit settable to a plurality of internal states and having a plurality of output conductors, to detect whether any of a plurality of sources of bilevel voltage has a predetermined voltage level, said method comprising the steps of:

1. connecting a plurality of output conductors of the digital logic circuit to corresponding ones of said plurality of sources of bilevel voltage;

2. supplying to the digital logic circuit its main operating supply voltage;

3. setting the digital logic circuit to different internal states to selectively energize its output conductors in a configuration corresponding to the then existing internal state of the logic circuit; and 4. producing a predetermined detection signal when a substantial current is drawn from its main operating voltage supply by the digital logic circuit;

whereby the presence or the absence of the predetermined detection signal after each setting of the logic circuit indicates if a then energized one of the output conductors of said counter is connected to a source of bilevel voltage which is at a voltage level at which the source draws substantial current from the digital counter.

20. The method defined by claim 19 wherein said step of producing a predetermined detection signal includes the step of changing the state of a switching circuit to generate the detection signal as an output signal of the switching circuit when a substantial current is drawn from the digital logic circuit's main operating voltage supply by the digital logic circuit.

* * * * *